United States Patent [19]
Messman

[11] Patent Number: 5,189,599
[45] Date of Patent: Feb. 23, 1993

[54] HIGH VOLTAGE REGULATOR FOR AN INTEGRATED HORIZONTAL SWEEP SYSTEM

[75] Inventor: Bruce E. Messman, Lake In the Hills, Ill.

[73] Assignee: Zenith Electronics Corporation, Glenview, Ill.

[21] Appl. No.: 744,773

[22] Filed: Aug. 14, 1991

[51] Int. Cl.$^5$ ............................................. H02M 3/335
[52] U.S. Cl. ........................................ 363/21; 363/71; 363/97; 363/131
[58] Field of Search ...................... 363/20, 21, 65, 71, 363/97, 131

[56] References Cited

U.S. PATENT DOCUMENTS

| | | | |
|---|---|---|---|
| 3,742,242 | 6/1973 | Morio et al. | 363/21 |
| 4,242,714 | 12/1980 | Yoshida et al. | 315/408 |
| 4,466,051 | 8/1984 | Fitzgerald | 363/21 |
| 4,524,411 | 6/1985 | Willis | 363/21 |
| 4,546,421 | 10/1985 | Bello et al. | 363/97 |
| 4,614,899 | 9/1986 | Webb et al. | 315/411 |
| 4,808,906 | 2/1989 | Liepe | 358/190 |
| 4,956,587 | 9/1990 | Kitou et al. | 315/411 |
| 5,019,754 | 5/1991 | Onozawa et al. | 315/408 |
| 5,021,719 | 6/1991 | Arai et al. | 315/364 |

Primary Examiner—Steven L. Stephan
Assistant Examiner—Jeffrey Sterrett

[57] ABSTRACT

A voltage regulator for a flyback-type high voltage supply having: a pulse transformer with its secondary interconnected in series with the primary of a flyback transformer; a control circuit for sensing the generation of a flyback pulse, a reference voltage, and a feedback voltage signal appearing at the output of the flyback transformer; and a switch for selectively applying energy to the primary of the pulse transformer while uniformly maintaining the flow of current through the primary of the flyback transformer.

20 Claims, 4 Drawing Sheets

HIGH VOLTAGE REGULATOR FOR AN INTEGRATED HORIZONTAL SWEEP SYSTEM

TECHNICAL FIELD

This invention relates to the general subject of voltage regulators for pulsed voltage power supplies and, in particular, to voltage regulators for flyback-type high voltage supplies adapted for use in cathode ray displays, video display terminals and computer monitors.

BACKGROUND OF THE INVENTION

Cathode ray tubes (CRTs) are the most widely used electro-optic image transducers ever devised. Their major usage began with the introduction of television news and entertainment broadcasting and has now spread into all systems of visual image presentation, information displays and computer data readout. Such displays are generated by rapid movement of an information modulated electron beam by means of magnetic fields introduced by coils mounted externally on the neck of the tube. An accelerating voltage of several thousand volts assures projection of the electron beam onto the phosphor coated screen with sufficient energy to cause it to write with a brilliant glow.

When such a beam is deflected according to an orderly procedure of movement (such a from left to right across the screen starting at the upper left and proceeding downward), a rectangular patch is recorded for the viewer's visual retention. When repeated often enough, the illusion of continued presence of such an image field is created. Variations in the intensity of the electron beam as it moves repeatedly through such a scanned raster register in the eye and mind of the viewer as recognizable geometric images.

It is common practice to move the electron beam across the screen at a uniform velocity both in the direction of the rapid line scan (generally horizontal) as well as in the slower (generally vertical) field scanning direction. Linearly variant current ramps are applied to the deflecting coils on the neck of the tube to accomplish this. Each current ramp terminates as the electron beam reaches its extreme position and then reverses direction quickly causing the beam to return to its starting point. In order to support the illusion of continued image presence without tell-tale flicker becoming apparent, it is necessary to refresh the entire image at least fifty or sixty times per second. When a fine structure of many hundred scanning lines are to be included in the display so as to provide good image resolution, the line scanning rate may need to be as high as one hundred thousand sweeps per second. It is standard practice to use only about sixteen thousand for broadcast television purposes. For computer driven monitors and displays (e.g., VGA, Super VGA, High Resolution, etc.), the scanning rate is even faster.

The cathode ray beam accelerating voltage (i.e., second anode voltage) often ranges from twelve to thirty kilovolts, depending upon screen size and the desired brightness level of the image generated. The current requirement imposed upon this high voltage source may range from fifty or one hundred microamps for monochrome screen to one or two milliamperes for color cathode ray tubes. The high voltage source itself can be any available type of power generator provided it can support the current demand of the CRT and has an upper current limit of a few milliamperes beyond which the voltage collapses so as to protect servicing personnel from instant electrocution should they make accidental contact therewith.

Early in the development of television broadcasting, a unique type of second anode voltage supply for magnetically deflected cathode ray tubes was developed. This very simple and inexpensive high voltage power supply system is a supplement to the magnetic beam deflection technique previously described and makes use of the rapid current reversal rapidly and repeatedly returns the electron beam to its start of sweep position. However when an electric current changes value rapidly while flowing in an inductor such as a deflecting coil, it creates a substantial voltage across the terminals of the coil by self induction. Thus, a brief voltage pulse, reaching several hundred volts in magnitude, is generated on the terminals of the deflection coil as it caused "flyback" of the CRT beam, line-by-line.

As a source of voltage, this "flyback" pulse found on the deflection coil terminals is powerful and can stand heavy loading due to the low internal impedance of the deflection coil system. It is only necessary therefore to "step up" this voltage by means of a transformer. The several hundred volt level of the deflection coil can thus be raised to the several thousand volt (rectified DC) level required to supply second anode voltage for the tube.

In this manner a low cost combination line deflection and high voltage generator has been developed for use with cathode ray tubes. The flyback high voltage system has reached almost universal acceptance in all forms of commercial cathode ray display devices in spite of one important limitation, a visible geometric expansion of the rawer area as screen brightness is increased. This defect is due to falling second anode voltage or poor high voltage regulation. Poor regulation (e.g., about 10 to 15 percent or less), although acceptable for an entertainment television display, is unacceptable for such critical display systems such as ultrasonic medical imagery, word processing business machines, computer aided design screens, and other systems which are sensitive to exactness of image size. Poor voltage regulation in the flyback-type high voltage system just described is due to the inherently high internal source impedance of the step-up transformer and pulse rectifying arrangement. The system operates in a completely open loop manner, and generally lacks the benefit of any current preload. Many prior art attempts have been made to stabilize the voltage of such power supplies:

1. Using a high voltage shunt transistor (e.g., a Zener diode) to load the supply until an external load is applied, thereby holding a fixed threshold voltage level. This approach wastes power and heats up the thyristor which leads to early destruction.
2. Using a vacuum tube shunt regulator with or without voltage feedback loop control. This approach is also a power waster because the tube heater must also be activated; however, the components exhibit longer life.
3. Using an adjustable flyback interval under feedback loop control, having either inductive or capacitive tuning means, to control flyback voltage. Such a technique requires complex adjustment and the variable tuning is generally visible on the screen.
4. Using a separate flyback high voltage supply section independent of the deflection yoke section with an adjustable DC voltage source under feedback loop control. Although this is successful and is widely used, it is expensive and power inefficient due to near duplication of components.

5. Using a supplementary adjustable DC source added to the high voltage winding to offset internal drop as it occurs. This also requires a large number of additional components and power is inefficient. Using a pulse width modulated feedback loop which supplies sufficient additional voltage, through an energy storage transformer, during the generation of each flyback pulse in order to maintain the high voltage output of the flyback transformer near a regulated level (e.g., U.S. Pat. No. 4,614,899 to Webb et. al.). Although voltage regulation is satisfactory, deflection yoke current is affected and image size is not exact.

Finally, while the above problem is characteristic of flyback-type high voltage power supplies, it is symptomatic of all pulsed voltage power supplies.

Thus, while there has been considerable progress in the design of voltage regulators for a flyback type high voltage power supply for a CRT, there are still some important shortcomings. In particular, while television displays operate under one standard frequency scanning rate, modern video monitors must be capable of operating in accordance with a plurality of video driving protocols (e.g., VGA etc.) In addition, even with voltage regulation, it is unacceptable for video displays to be affected by changes in current flow through its deflection yoke. An improved voltage regulator for a flyback-type voltage supply would be welcomed by users of video monitors, particularly those who demand exactness in image size.

SUMMARY OF THE INVENTION

A general object of the invention is to provide a high voltage regulation circuit for a pulsed voltage power supply.

Another objective of the invention is to provide a high voltage regulation circuit for a flyback-type voltage supply.

Still another object of the invention is to provide a high voltage regulator for a CRT display while maintaining a more uniform flow of current through the deflection yoke.

One specific object of the invention is to provide a voltage regulation circuit for a multi-frequency video display.

Yet another object of the invention is to provide a voltage regulator for a pulsed voltage power supply, wherein the additional energy applied to the primary of a flyback transformer is generally the same.

In accordance with the present invention, a voltage regulator is provided for a pulsed voltage power supply which generates voltage pulses to produce an unregulated output voltage. The voltage regulator comprises: first producing means, connected to the output of said power supply, for producing voltage feedback signals which are proportional to the magnitude of said output voltage; second producing means, receptive to said voltage pulses, for producing timing signals corresponding to the time for generation of each said voltage pulses; third producing means for producing a reference voltage; and constant energy applying means, receptive of said voltage feedback signals from said first producing means, said timing signals from said second producing means and said reference voltage from said third producing means, for applying sufficient additional voltage during said time for generation of each of said voltage pulses in order to maintain said voltage feedback signals substantially equal to said reference voltage, to maintain the combination of said additional voltage and said voltage pulses near a regulated level, and to uniformly maintain the current flow through said deflection yoke.

In one embodiment of the invention current through a deflection yoke is uniformly maintained and the high voltage output is kept near a regulated level by means of a modulation circuit which supplies an additional voltage pulse to each flyback pulse; in particular, the additional voltage pulse begins at a predetermined time before the time for generation of the flyback pulse, ends during the generation of the flyback pulse, and ends later in time when there is a greater difference between the reference voltage and the feedback voltage.

In one embodiment of the invention, the modulation circuit is controlled by a gating circuit which receives timing signals from the flyback transformer and timing signals from the driver of the deflection yoke circuit, whereby the voltage regulator is capable of operating at a plurality of horizontal scanning frequencies.

Numerous other advantages and features of the present invention will become readily apparent from the following detailed description of the invention, the embodiments described therein, from the claims, and from the accompanying drawings.

DETAILED DESCRIPTION

While this invention is susceptible of embodiment in many different forms, there is shown in the drawings, and will herein be described in detail, one specific embodiment of the invention. It should be understood, however, that the present disclosure is to be considered an exemplification of the principles of the invention and is not intended to limit the invention to the specific embodiment illustrated.

Before describing the present invention, a basic prior art voltage regulator circuit for a flyback-type high voltage power supply will be described in order to highlight the shortcoming of the prior art and the advantages of the present invention.

Figure 1:
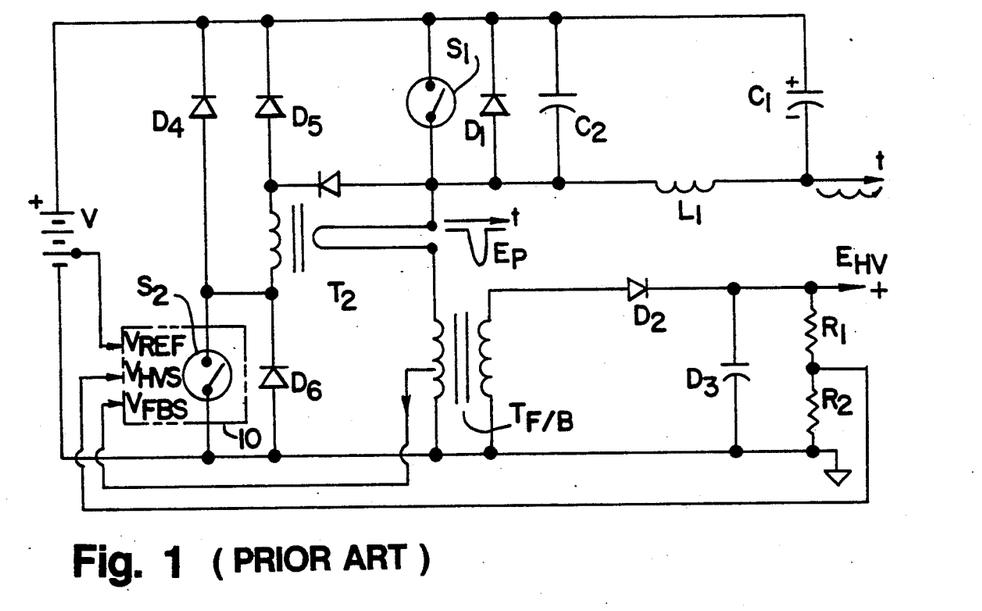
FIG. 1 is a schematic diagram of a prior art flyback-type voltage power supply.

Turning to FIG. 1, a main electronic switch $S_1$ is used to create an intermittent path for current between voltage source V and a deflection coil $L_1$. The main switch $S_1$ is closed for a little less than one half of each sweep cycle and switching cycles occur at the line sweep frequency, thus creating a current waveform which flows in the reflection yoke.

When the main switch $S_1$ is open, a path for current is provided to charge a large capacitor $C_1$ from a source V via to deflection yoke $L_1$ and the primary winding of the flyback transformer $T_{F/B}$. This capacitor $C_1$ is large and takes on a voltage charge equal to approximately V. This voltage is maintained by the capacitor $C_1$ since the capacitor alternately charges and discharges by equal currents in and out of the deflection yoke $L_1$ by action of the switch $S_1$.

Upon closure of the main switch $S_1$ the voltage on the capacitor $C_1$ is impressed upon deflection yoke $L_1$ and current flows through it. Upon opening the main switch $S_1$, the energy stored inductively on the deflection yoke finds a path into another capacitor $C_2$, which is conventionally called the "flyback tuning capacitor". At this time one undamped half-sinusoidal voltage pulse Ep (i.e., the basic flyback voltage pulse) is created, during the sweep cycle. The current reverses its direction of flow and now flows linearly outward from deflection yoke $L_1$ via a damper diode $D_1$ and back into the large capacitor $C_1$. The size and shape of the basic flyback pulse Ep is determined by the inductance and capacitance values involved.

The voltage on the large capacitor $C_1$ changes slightly due to its having equal currents flowing into and out of it. Thus, the deflection yoke $L_1$ generates a linearly varying magnetic field which can deflect the CRT beam equally to either side of its freefall center position, as there is no net DC component of current in it.

The primary flyback voltage pulse Ep (see FIG. 2) will have a peak value from a few hundred volts to more than 1000 volts depending upon the sweep system design. The flyback transformer, $T_{F/B}$ is arranged to receive this flyback pulse Ep across its primary winding. The inductance of the primary winding is often chosen to be from five to ten times larger than the inductance of the deflection yoke $L_1$ to minimize interference with the operation of the deflection system. Furthermore, the flyback transformer, $T_{F/B}$ extracts only a relatively small fraction of the energy available in each primary flyback pulse Ep which it converts by turns ratio transformation into a much larger pulse. This latter secondary pulse is then rectified by a diode $D_2$ and filtered by a capacitor $C_3$ to become the desired second anode voltage $E_{HV}$ necessary to energize the cathode ray tube. In the absence of a voltage regulator, the magnitude of the secondary voltage pulse is unregulated and, therefore, the voltage at the output of the supply is unregulated.

Voltage regulation in one prior art device (i.e., U.S. Pat. No. 4,614,899 to Webb et al) is achieved by the addition of a supplementary energy storage transformer $T_2$, a steering diode $D_3$, voltage limiting diodes $D_4$, $D_5$ and $D_6$, an auxiliary switch $S_2$, a Control Circuit 10 and a high voltage sampling resistor divider assembly $R_1$ and $R_2$.

The Control Circuit 10 receives line sweep timing information $V_{F/B}$ by means of a sample of the flyback pulse taken from a tap on the primary of the flyback transformer $T_{FB}$. It is also furnished with a fixed reference DC voltage $V_{REF}$, taken from tap on the voltage source V, is also provided to the Control Circuit 10.

The Control Circuit 10 serves to compare a high voltage sample $E_{HVS}$, which is fed back from the high voltage $E_{HV}$ at the output of the power supply via the resistor divider assembly $R_1$ and $R_2$, and the fixed reference voltage $V_{REF}$ so as to close and open the auxiliary switch $S_2$ at appropriate times and thus achieve control of the D.C. high voltage $E_{HV}$.

Figure 2:
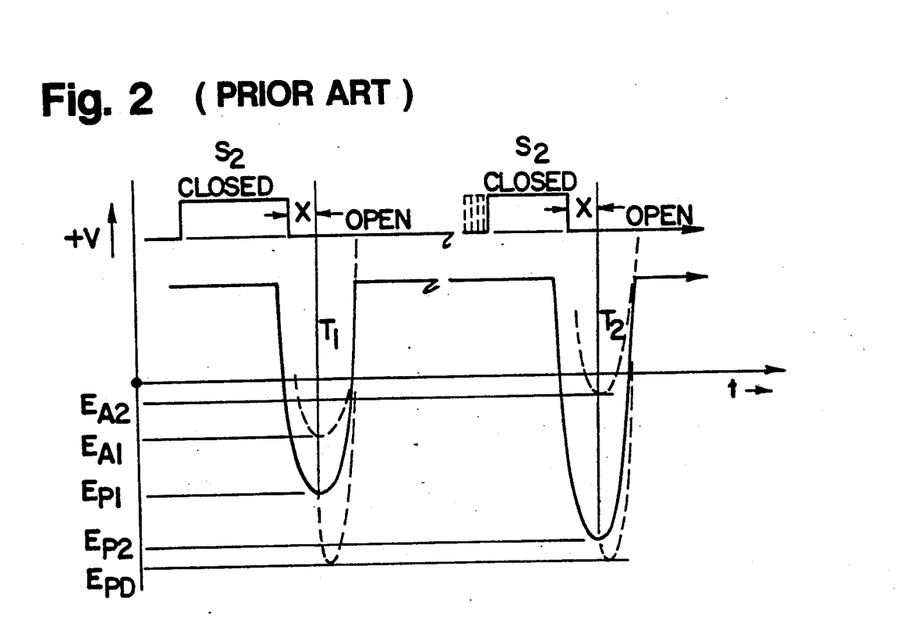
FIG. 2 is a graph showing the application of additional voltage to the primary of the flyback transformer of FIG. 1.

The auxiliary switch $S_2$ can be closed by the Control Circuit 10 at any point in time during the sweep cycle (see FIG. 2). The main switch $S_1$, being closed during a large part of this period, provides a path for current from the voltage source V, via the steering diode $D_3$, into the primary of the energy storage transformer $T_2$. Upon closure of the auxiliary switch $S_2$, a current begins to flow and to increase linearly toward some terminal value which it will have at the time the main sweep control switch $S_1$ is opened and the basic flyback pulse Ep is initiated. The energy stored in the transformer $T_2$ will be proportional to the product of its inductance value and the square of the peak current amplitude reached. Thus, the stored energy level in the energy storage transformer $T_2$ increases very rapidly as the auxiliary switch $S_2$ is closed earlier in the sweep cycle. The auxiliary switch $S_2$ opens at a time slightly later than the main switch $S_1$, thereby necessitating the sensing of the generation of the flyback pulse Ep as a timing signal $V_{FBS}$.

Whatever energy that may be present in storage transformer $T_2$ when the auxiliary switch $S_2$ is opened, joins with the energy in the basic flyback pulse Ep to produce a combined flyback pulse having a larger voltage level, as shown in FIG. 2. In particular, energy $E_A$, from the energy storage transformer $T_2$ flowing through its secondary winding, is added as a voltage pulse directly to the basic flyback pulse Ep of the deflection coil system so as to supplement it in driving the primary of the high voltage transformer $T_{F/B}$. Thus, the final rectified D.C. voltage $E_{HV}$, from the secondary of the flyback transformer $T_{F/B}$ is placed directly under control of, or is a function of, the position in time at which the auxiliary switch $S_2$ closed.

As shown in FIG. 2, a voltage pulse Ep, generated by the basic conventional circuit of FIG. 1 (or by any other pulsed voltage power supply), may be unregulated or variable over time in addition to varying with the load being driven. For example, during the time that a voltage pulse $E_{P1}$ is less than the voltage pulse $E_{P2}$ which occurs during time $T_2$ due to the unregulated nature of the power supply. Both voltage pulses $E_{P1}$ and $E_{P2}$, in this example, are less than the desired output pulse $E_{PD}$. The variation in output power occurs over the generation of many flyback pulses, therefore, the intervals $T_1$ and $T_2$ are shown separated in time.

In FIG. 2, an additive pulse $E_{A1}$ at one time $T_1$ is greater in magnitude than the magnitude of an additive pulse $E_{A2}$ at a later time $T_2$. To regulate the varying nature of the voltage pulse Ep and to achieve output regulation, the auxiliary switch $S_2$ of the Control Circuit 10, is shut off in the sweep cycle to permit more energy to build up in the primary of the auxiliary transformer $T_2$ and to create a pulse $E_{A1}$. In particular, the auxiliary switch $S_2$ is closed later in the sweep cycle to lessen the energy buildup to create pulse $E_{A2}$.

PRESENT INVENTION

Figure 3:
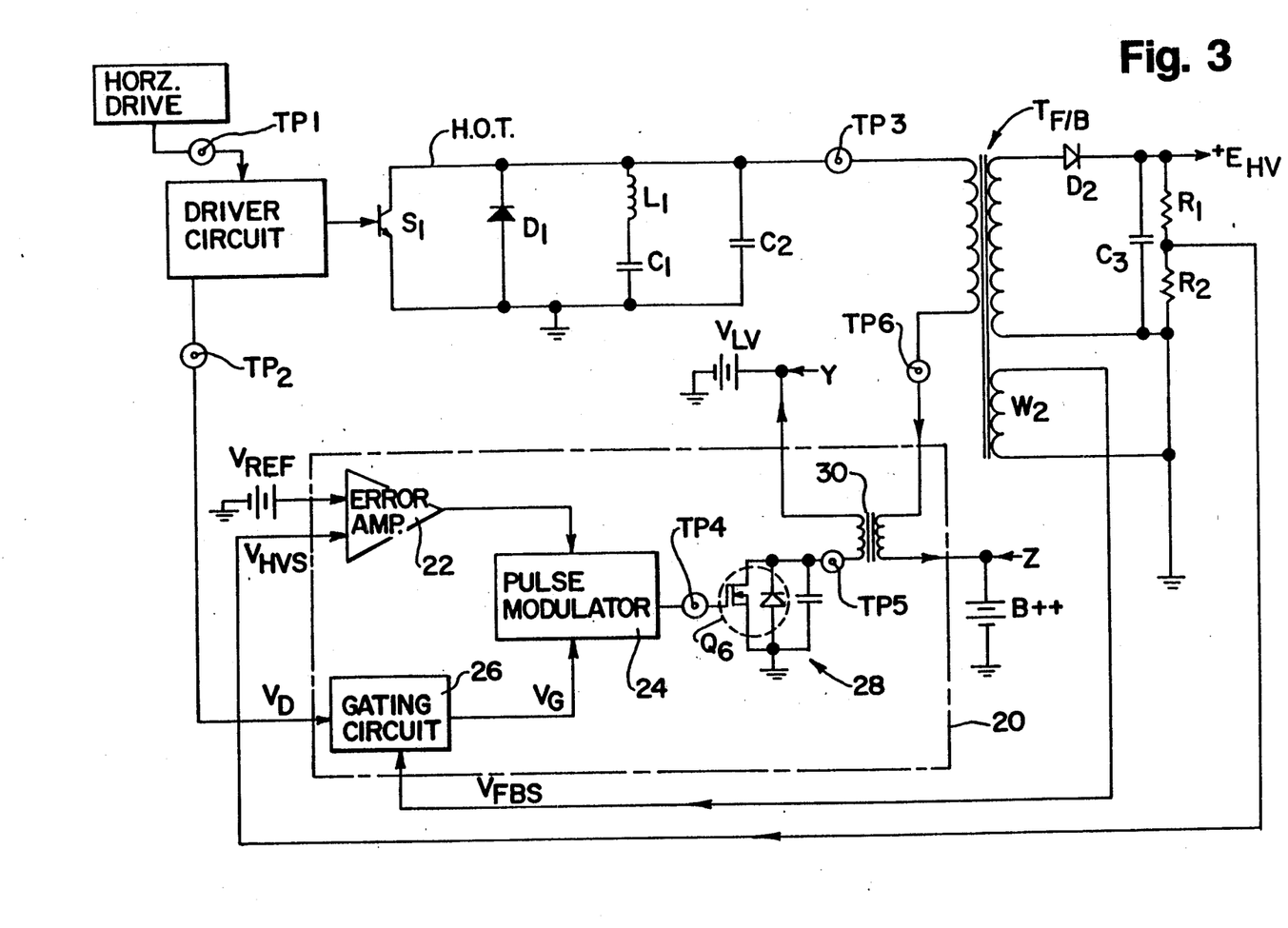
FIG. 3 is a schematic diagram of the voltage regulation circuit of the present invention.

The voltage control loop of the invention, shown in FIG. 3, comprises a voltage divider network $R_1$ and $R_2$, a winding $W_Z$ on the secondary side of the flyback transformer $T_{F/B}$, a reference voltage source $V_{REF}$, and a Control Circuit 20.

The function of the Control Circuit 20 is to produce a small constant amplitude auxiliary flyback pulse $TP_6$ (approximately equal in pulse width to the system flyback pulse $TP_3$), $TP_3$ whose phase relationship with the system flyback pulse can be modulated. This pulse is injected into the low side of the primary winding of the flyback transformer $T_{F/B}$, by means of the pulse transformer 30, at the proper time to add or subtract the peak voltage across the primary winding of the flyback transformer. This voltage is transformed to the secondary of a flyback transformer $T_{F/B}$ where it becomes rectified in the usual manner by a secondary diode $D_2$ and internal and external capacitance $C_3$ to produce the CRT anode high voltage $E_{HV}$.

The Control Circuit 20 comprises an Error Amplifier 22, a Pulse Modulator 24, a Gating Circuit 26, and a Switch Network 28. The Switch Network 28 causes current from a low voltage source $V_{LV}$ to flow through the primary of the pulse transformer 30. The secondary of the pulse transformer 30 is in series with the primary of the flyback transformer $T_{F/B}$ and a Scan B-plus Voltage Supply B++. The Pulse Modulator 24 activates the Switch Network 28 in accordance with the output of the Gating Circuit 26 and the Error Amplifier 22.

In particular, the CRT anode high voltage $E_{HV}$ is fed back from the voltage divider network $R_1$ and $R_2$ to the Error Amplifier 22 where it produces an error voltage to change the relative phase of the injected flyback pulse (i.e., at $TP_6$) and thereby regulate the high voltage $E_{HV}$. Since the average DC voltage into the system is unchanged, the CRT anode high voltage can be modified independently of the horizontal scanning current through the deflection yoke $L_1$. Conversely, the Scan B-plus Voltage Supply B++ (about 60 to 120 VDC) can be altered to change scanning size or can be modulated for pin cushion correction independently of the high voltage output of the flyback transformer $T_{F/B}$.

The Gating Circuit 26 prevents the injected flyback pulse (at $TP_6$) from occurring before the system flyback pulse (at $TP_3$) which would otherwise occur primarily due to storage time delays of the horizontal output switch $S_1$. This is done by latching its output from a sample of the drive waveform from the horizontal output switch $S_1$ and unlatching it when a sample of the system flyback pulse $V_{FBS}$ occurs. Thus, the switches $S_1$ and $Q_6$ are caused to be 'closed' simultaneously, but the opening of the gating switch $Q_6$ is delayed until the occurrence of the sample flyback pulse $V_{FBS}$. Turn-off delays in the Switch Network 28 are very small so the system flyback pulse (at $TP_3$) and the injected flyback pulse (at $TP_6$) occur virtually simultaneously (i.e., zero phase shift). Since a Pulse Transformer 30 is phased to produce a negative voltage pulse (at $TP_6$), a maximum peak voltage is developed across the Flyback Transformer $T_{F/B}$ primary winding. This yields maximum voltage output at $+E_{HV}$.

The Pulse Modulator 24 receives the unmodulated square wave from the Gating Circuit 26 and then performs the function of variably shifting the time at which the gating switch $Q_6$ is turned off (i.e., falling edge $P_1$) thus shifting the phase of the injected flyback pulse from zero degrees (i.e., no phase shift, maximum $+E_{HV}$) to a maximum of 90 degrees (i.e., minimum $+E_{HV}$) relative to the system flyback pulse. The amount and direction of phase shift is controlled by the output of Error Amplifier 22 which regulates the output $+E_{HV}$ by comparing a sample of $+E_{HV}$ (i.e., $E_{HVS}$) via resistor divider network $R_1$ and $R_2$ to the voltage reference $V_{REF}$.

Figure 4A:
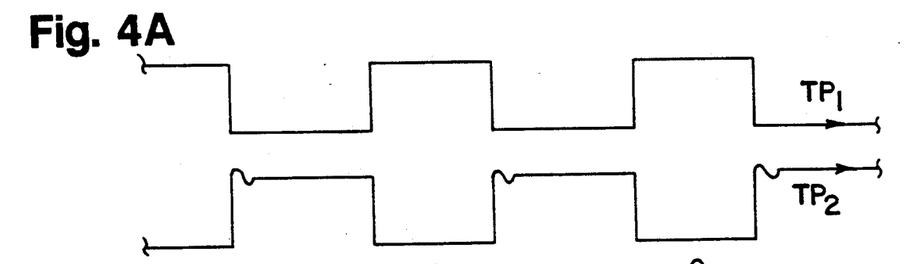
FIG. 4A through 4D depict the waveforms at selected portions of the circuit of FIG. 3.
Figure 4B:
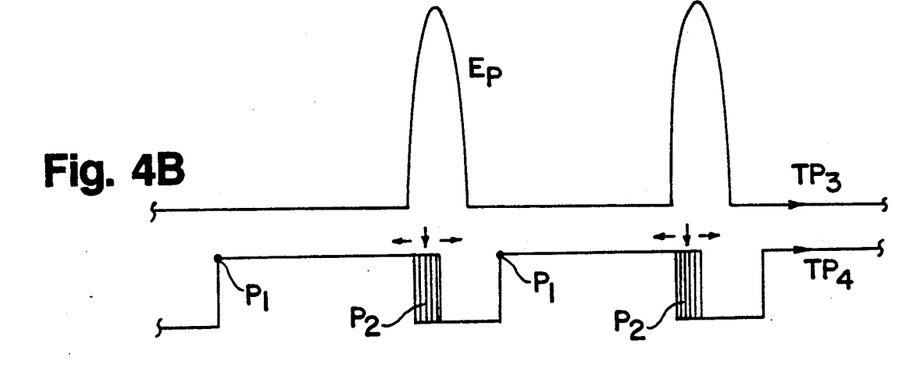
Figure 4C:
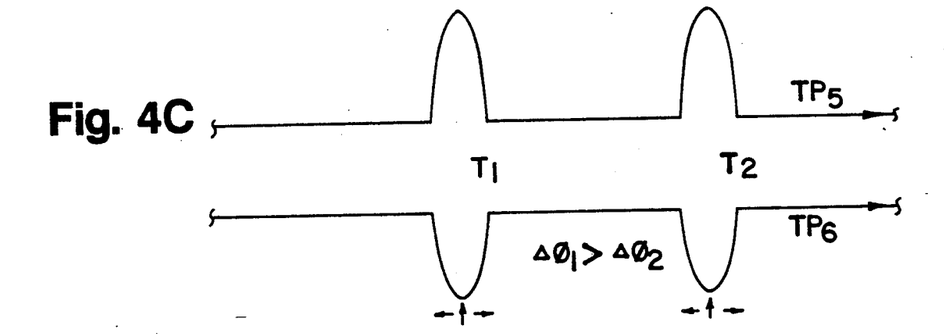
Figure 4D:
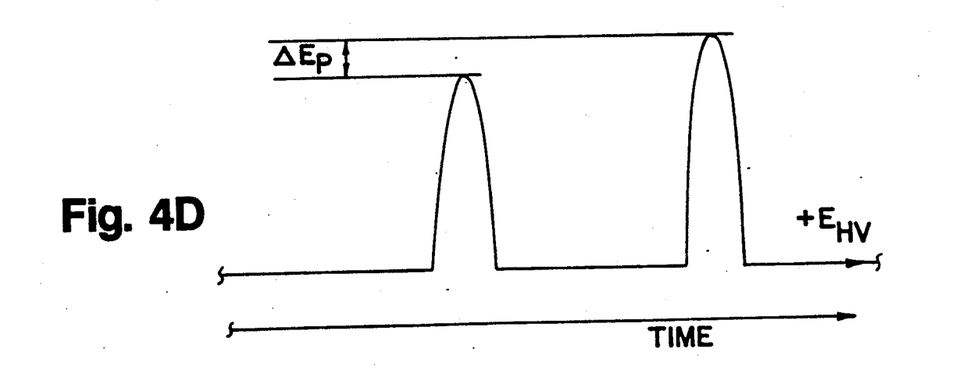

Those skilled in the art will recognize that by closing the Switching Network 28 at the same point $P_1$ in time relative to the system flyback pulse Ep (see FIG. 4B), the amount of energy extracted, or the current which flows through the yoke $L_1$ does not change from one sweep to the next. Moreover, since the point in time $P_2$ where the Pulse Modulator 24 opens the Switching Network 28 changes and since that point in time is during the flyback pulse, the operative effect is that of pulse position modulation or phase modulation rather than ordinary pulse width modulation.

The efficiency of the regulator that is the subject of the present invention is high, since it operates in a "switching" mode. High power linear components are not required.

In addition, the speed of regulator is inherently fast since the injected flyback pulse is always present and need only be modulated in time to alter the high voltage output $E_{HV}$. This design feature eliminates the problem of having to charge a large capacitor through a low source impedance (e.g., regulating by modulating the B+supply into a filter/bypass capacitor).

Figures 5, 6:
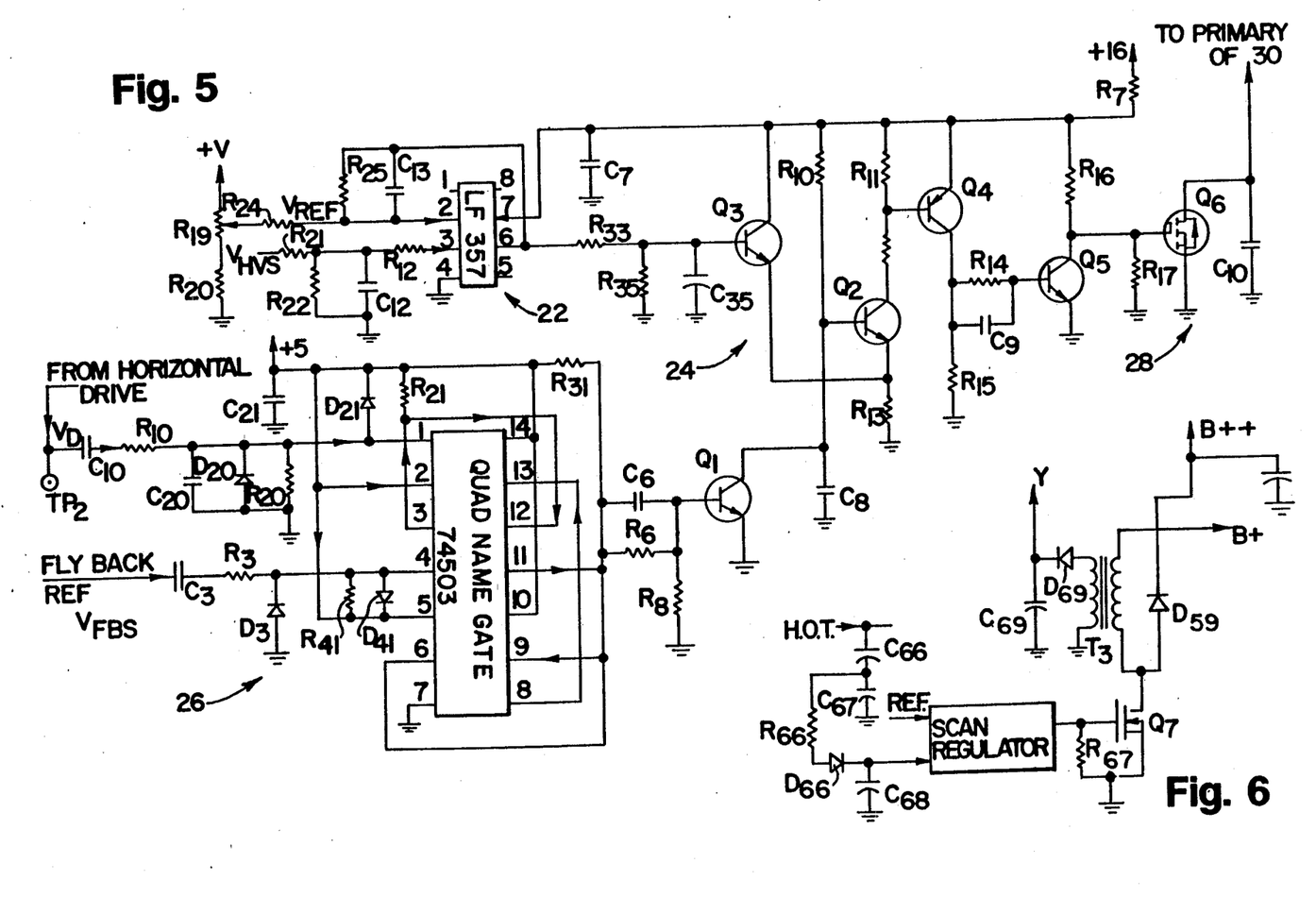
FIG. 5 is a detailed, partial schematic diagram of one practical embodiment of the circuit of FIG. 3.
FIG. 6 is a schematic diagram of two voltage supplies shown in FIG. 3.

In addition, the system is well suited for multi-frequency applications, since there isn't any large time constraint in the pulse circuit itself. For wide band multi-frequency applications, the low voltage supply $V_{LV}$ (e.g., about 16 to 32 VDC) to the primary of the pulse transformer 30 need only be connected to a tap in the scan system regulator (See FIG. 6) to change the applied voltage at the same ratio as the system voltage.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and features of the invention may be modified. For example, to use the voltage regulator in a single frequency environment, the scan system regulator (See FIG. 6) can be omitted and the primary of the pulse transformer 30 can be connected to a low voltage supply which is not operated in response to the Scan B-plus voltage Supply B++. Thus, it will be appreciated that various modifications, alternatives, variations, etc., may be made without departing from the spirit and scope of the invention as defined in the appended claims. It is of course, intended to cover by the appended claims all such modifications involved within the scope of the claims.

I claim:

1. A voltage regulator for a pulsed voltage power supply, said supply being capable of generating a series of voltage pulses to produce an unregulated voltage at the output of said supply, said voltage regulator, comprising:

first producing means, connected to the output of said supply, for producing a voltage feedback signal which is proportional to the magnitude of said output voltage;

second producing means, receptive to said voltage pulses, for producing a timing signal corresponding to the time for generating of each said voltage pulses;

third producing means for producing a reference voltage, and constant energy applying means, receptive of said voltage feedback signal from said first producing means and of said timing signal from said second producing means and of said reference voltage from said third producing means, for applying sufficient additional voltage during said time for generating of each of said voltage pulses in order to maintain said voltage feedback signal substantially equal to said reference voltage and to maintain the combination of said additional voltage and said voltage pulse near a regulated level, said applying means producing a series of additional voltage pulses which are synchronized with said voltage pulses, each one of said additional voltage pulses beginning at a predetermined point in time relative to the beginning of one of said voltage pulses and ending at a variable point in time which is during the generation of said one voltage pulse and which is a function of the magnitude of the difference between each one of said voltage pulses and said reference voltage.

2. The voltage regulator of claim 1, wherein said applying means further comprises:
  a transformer having a primary and a secondary, wherein said secondary is interconnected with said supply of said series of voltage pulses so as to be able to add to said voltage pulses; and
  providing means, operatively interconnected to said primary of said energy storage transformer and receptive of said voltage feedback signal and said timing signal and said reference voltage, for providing sufficient voltage to said primary of said transformer in order for said secondary to apply said additional voltage.

3. The voltage regulator of claim 2, wherein said providing means further comprises:
  a switch, connecting a voltage source to said primary of said transformer, for selectively applying said sufficient voltage to said primary; and
  a control circuit, receptive of said voltage feedback signal and said timing signal and said reference voltage, for selectively closing said switch at a predetermined point in time before the generation of each of said voltage pulses, said control circuit opening said switch earlier in time when a greater difference between the reference voltage and the voltage feedback signal exists in order to increase the amount of voltage applied to said transformer, whereby pulses of generally the same energy are applied.

4. A voltage regulator for a flyback-type voltage supply, said supply having a deflection yoke circuit connected to the primary of a flyback transformer, and said supply being capable of generating a series of unregulated voltage flyback pulses at said primary in order to produce an unregulated voltage at the output of said supply, said voltage regulator comprising:
  first producing means connected to the secondary of said flyback transformer for producing a voltage feedback signal proportional to the magnitude of said output voltage;
  second producing means, connected to said primary of said flyback transformer, for producing flyback timing signal corresponding to the time for generation of each said flyback pulses;
  third producing means for producing a reference voltage; and
  applying means, operatively connected to the primary of said flyback transformer and receptive of said voltage feedback signal from said first producing means and said flyback timing signal from said second producing means and said reference voltage from said third producing means, for applying sufficient additional voltage to the primary input of said flyback transformer during said time for generation to maintain the voltage feedback signal substantially equal to said reference voltage, to maintain the combined voltage pulses near a regulated level, and to maintain generally the same flow of current through said deflection yoke circuit, said applying means including switch means for applying a voltage pulse through said primary of said flyback transformer and including means for selectively closing said switch means at a predetermined point in time before the generation of each of said flyback pulses.

5. A voltage regulator for a flyback-type voltage supply, said supply having a deflection yoke circuit connected to the primary of a flyback transformer, said supply being capable of generating a series of voltage flyback pulses at said primary in order to produce an unregulated voltage at the output of said supply, said voltage regulator comprising:
  first producing means, connected to the secondary of said flyback transformer, for producing a voltage feedback signal proportional tot he magnitude of said output voltage;
  second producing means, receptive of said flyback pulse, for producing a flyback timing signal corresponding to the time for generation of said flyback pulse;
  third producing means for producing a reference voltage; and
  means, operatively connected tot he primary of said flyback transformer and receptive of said voltage feedback signal from said first producing means and said flyback timing signal from said second producing means and said reference voltage from said third producing means, for supplying a voltage pulse to each of said flyback pulses in order to maintain the high voltage feedback signal substantially equal to said reference voltage, each of said voltage pulses beginning at a predetermined time before said time for generation of said flyback pulse and ending during the generation of said flyback pulse and later in time when there is a greater difference between said reference voltage and said feedback voltage.

6. A voltage regulator for a flyback-type voltage supply, said supply having a deflection yoke circuit connected to the primary of a flyback transformer for generating a series of high voltage flyback pulses, said supply producing an unregulated output voltage, said voltage regulator comprising:
  another transformer having a primary and having its secondary interconnected in series with said primary of said flyback transformer;
  first producing means, connected to said output of said supply, for producing voltage a feedback signal proportional to the magnitude of each of said high voltage flyback pulses;
  second producing means, receptive of said flyback pulse, for producing a flyback timing signal corresponding to the time of generation of each of said high voltage flyback pulses;
  third producing means for producing a reference voltage; and
  supplying means, receptive of said voltage feedback signal from said first producing means and said flyback timing signal from said second producing means and said reference voltage from said third producing means, for supplying a voltage pulse to the primary input of said another transformer at a position in time during the generation of each said flyback pulses to maintain the high voltage feedback signal substantially equal to said reference voltage and to maintain each of the combined voltage pulses near a regulated level, said supplying means including switch means for supplying a voltage source through said primary of said another transformer and including means for selectively closing said switch means at a predetermined point in time before the generation of each of said flyback pulses.

7. A voltage regulator for a flyback-type high voltage supply, said voltage supply having a deflection yoke circuit connected to the primary of a flyback transformer for generating a series of high voltage flyback pulses at the primary of said flyback transformer in order to provide an unregulated output voltage, said voltage regulator comprising:
   a pulse transformer having a primary winding and having a secondary winding interconnected in series with said primary of said flyback transformer;
   a switch, connected to said primary winding of said pulse transformer, for selectively applying a voltage source to said primary;
   first producing means, connected to said output voltage, for producing a voltage feedback signal proportional to the magnitude of said output voltage,
   second producing means, connected to a secondary of said flyback transformer, for producing a flyback timing signal corresponding to the generation of each of said high voltage flyback pulses;
   third producing means for producing a reference voltage; and
   a control circuit, receptive of said voltage feedback signal from said first producing means and said flyback timing signal from said second producing means and said reference voltage from said third producing means, for selectively closing said switch at a fixed point in time before the generation of each of said high voltage flyback pulses, and for selectively opening said switch later in time during the generation of said high voltage flyback pulse when a greater difference between said reference voltage and said high voltage feedback signal exists so that the addition of said applied voltage through said pulse transformer causes said difference to be nearly zero, said control circuit applying generally the same amount of energy to said primary winding of said pulse transformer.

8. The voltage regulator of claim 7, wherein said first producing means comprises a resistive voltage divider network connected across said voltage output of said flyback transformer, said resistive voltage divider having an electrical connection from a predetermined point on said divider to said control circuit.

9. The voltage regulator of claim 7, wherein said deflection yoke circuit, said primary of said flyback transformer and said secondary winding of said pulse transformer are connected in series with each other.

10. The voltage regulator of claim 7, wherein said switch is operated by said control circuit to produce an applied voltage proportional to and less than said voltage source.

11. The voltage regulator of claim 7, wherein said deflection yoke circuit is operated in response to a driver circuit which is operated by a horizontal drive waveform and which produces as one output a waveform which is the reverse of said drive waveform; wherein said control circuit includes a gating circuit, having as one input said reverse of said driver waveform and having as another input said flyback timing signal from said second producing means, for producing a gating signal for said switch to open after the generation of a flyback pulse.

12. The voltage regulator of claim 11, wherein said central circuit includes: an error amplifier which has an output and said reference voltage and said voltage feedback signal as inputs; and modulation means, cemented to said output of said error amplifier and to said gateway circuit, for opening and closing said switch.

13. A voltage regulator for a flyback-type voltage supply, said supply having a deflection yoke circuit connected to the primary of a flyback transformer for generating a series of flyback pulses in order to provide an unregulated output voltage at a said voltage regulator comprising:
   applying means, connected to the primary of said flyback transformer, for selectively applying energy to the primary of said flyback transformer;
   first producing means, connected to the secondary of said flyback transformer, for producing a feedback signal proportional to the magnitude of each flyback pulse;
   second producing means, receptive of each of said flyback pulses for producing a flyback timing signal corresponding to the generation of said flyback pulse;
   third producing means for producing a reference voltage; and
   a control circuit, receptive of said signal from said first producing means and said flyback timing signal from said second producing means and said reference voltage from said third producing means, for selectively activating said applying means at a predetermined time period before the generation of each of said voltage flyback pulses, and for deactivating said applying means during the generation of each of said voltage flyback pulses and at a later point in time when a greater difference between the reference voltage and the feedback signal exists in order to cause said difference to be nearly zero, said control circuit deactivating said applying means early during the generation of said flyback pulse in order to apply said additional voltage to said primary of said flyback transformer and to extract generally the same energy from said deflection yoke circuit.

14. A voltage regulator for a flyback-type high voltage supply, said supply having a deflection yoke circuit connected to the primary of a flyback transformer for generating a series of flyback pulses in order to provide an unregulated output voltage at a secondary of said flyback transformer, said voltage regulator comprising:
   a pulse transformer having a primary winding and having a secondary winding interconnected in series with said primary of said flyback transformer;
   first producing means, connected to said secondary of said flyback transformer, for producing a voltage feedback signal proportional to the magnitude of each of said high voltage flyback pluses;
   second producing means, connected to said flyback transformer, for producing a flyback timing signal corresponding tot he generation of each of said high voltage flyback pulses;

third producing means for producing a reference voltage; and applying means, receptive of said high voltage feedback signal from said first producing means and said flyback timing signal from said second producing means and said reference voltage from said third producing means, for applying sufficient voltage to said primary winding of said pulse transformer to maintain the high voltage feedback signal substantially equal to the reference voltage for each of said high voltage flyback pulses, to maintain the combined voltage pulses at a regulated level and to maintain generally the same current flowing through said deflection yoke circuit, said applying means including switching means for applying a relatively low voltage supply through said primary winding of said pulse transformer and including means for selectively closing said switching means at a predetermined point in time before the generation of each of said flyback pulses.

15. The voltage regulator of claim 14, wherein said first producing means comprises a voltage divider connected across said secondary of said flyback transformer.

16. The voltage regulator of claim 14, wherein said applying means comprises an error amplifier having as one input said reference voltage, having as another input said voltage divider, and having an output which is representative of the difference between said reference voltage and said secondary of said flyback transformer.

17. The voltage regulator of claim 16, wherein said applying means comprises modulator means, connected to the output of said error amplifier and to said second producing, means, for operating said switching means.

18. The voltage regulator of claim 17, wherein said switching means, said pulse transformer primary winding and said low voltage supply are connected in series with each other.

19. The voltage regulator of claim 18, wherein said pulse transformer secondary winding is connected in series with said primary winding of said flyback transformer and with a relatively high voltage supply.

20. The voltage regulator of claim 19, wherein said relatively low voltage supply and said relatively high voltage supply have outputs which are proportional to each other.

* * * * *